United States Patent [19]

Suzuki

[11] Patent Number: 4,879,691

[45] Date of Patent: Nov. 7, 1989

[54] OPTICAL RECORDING SYSTEM WITH OPTICAL RECORDING MEDIUM HAVING MULTILEVEL RECORDING SURFACE FOR TRACKING

[75] Inventor: Hidefumi Suzuki, Tokyo, Japan

[73] Assignee: CSK Corporation, Tokyo, Japan

[21] Appl. No.: 300,258

[22] Filed: Jan. 19, 1989

Related U.S. Application Data

[63] Continuation of Ser. No. 99,002, Sep. 21, 1987, abandoned.

[30] Foreign Application Priority Data

Sep. 20, 1986 [JP] Japan ................................. 61-222724
Sep. 20, 1986 [JP] Japan ................................. 61-222725

[51] Int. Cl.$^4$ ..................... G11C 7/00; G11C 13/04; G11C 13/00
[52] U.S. Cl. .................................. 365/215; 365/113; 365/234; 369/275
[58] Field of Search .............. 365/113, 106, 215, 234; 369/275, 277, 278, 118, 44; 235/454, 456, 487

[56] References Cited

U.S. PATENT DOCUMENTS

| | | | |
|---|---|---|---|
| 4,138,663 | 2/1979 | Lehuveau et al. | 365/234 |
| 4,145,758 | 3/1979 | Drexler et al. | 365/215 |
| 4,269,917 | 5/1981 | Drexler et al. | 430/16 X |
| 4,278,756 | 7/1981 | Bouldin et al. | 430/414 X |
| 4,278,758 | 7/1981 | Drexler et al. | 430/616 X |
| 4,310,916 | 1/1982 | Dil | 369/275 |
| 4,360,728 | 11/1982 | Drexler | 235/462 X |
| 4,385,303 | 5/1983 | Akahira et al. | 369/278 |
| 4,385,372 | 5/1983 | Drexler | 369/275 |
| 4,423,502 | 12/1983 | Dil | 369/275 X |
| 4,500,777 | 2/1985 | Drexler | 235/487 |
| 4,542,288 | 9/1985 | Drexler | 235/487 |
| 4,544,835 | 10/1985 | Drexler | 235/487 |
| 4,566,088 | 1/1986 | Yoshida et al. | 365/113 |

FOREIGN PATENT DOCUMENTS 2652936 5/1978 Fed. Rep. of Germany ...... 365/113

Primary Examiner—Stuart N. Hecker
Assistant Examiner—Alfonso Garcia
Attorney, Agent, or Firm—Lowe, Price, LeBlanc, Becker & Shur

[57] ABSTRACT

An optical recording medium which has data tracks and tracking lines juxtaposed with each other in a data recording region so as to write/read data into/from the data tracks, using the tracking lines as a reference. The data recording region is so configured as to have recessed portions and raised portions arranged alternatingly and extending along each other in a direction of data reading/writing. The so formed recessed portions and raised portions provide data tracks. With this configuration, the boundary edges between the respective recessed portions and the respective raised portions are used as tracking lines, so that data can be written in the recessed or raised portions, referring to the boundary edges as tracking lines.

28 Claims, 5 Drawing Sheets

OPTICAL RECORDING SYSTEM WITH OPTICAL RECORDING MEDIUM HAVING MULTILEVEL RECORDING SURFACE FOR TRACKING

This application is a continuation of application Ser. No. 07/099,002, filed Sept. 21, 1987, now abandoned.

FIELD OF THE INVENTION

This invention relates to an optical recording medium which has data tracks and tracking lines juxtaposed with each other on a data recording face of the medium, thereby to allow data to be read/written from/into the data tracks, using the tracking lines as a reference.

RELATED ARTS

Recently, an optical recording medium, which records digital data in the form of optically changed patterns, light and darkness, such as pits, has been attracting a public attention. Since this optical recording medium is capable of recording data at a high density within a small recording area, it can realize data storing of large capacity. By this reason, the optical recording medium may be provided not only in the form of disc but also in the form of card like a magnetic card.

In this connection, it is to be noted that the relative positioning between the optical recording medium and a reading/writing head should be accurate in a reading/writing operation, especially in this large capacity data storing medium. To effect tracking for positive and accurate tracking, tracking lines are provided along the data tracks in conventional optical recording medium. More illustratively, the data reading/writing operation is carried out, while tracing the tracking lines. In this case, a tracking light beam is irradiated on an edge of the band-formed tracking line and changes in a reflected light amount due to relative deviation of the edge are detected to as tracking errors.

Thus, in the conventional optical recording medium, the provision of the tracking lines are essential. This provision of the tracking lines reduces the area in which the data can be stored. For example, when one tracking line is provided for one data track, the area in which the data can be recorded is reduced substantially to ½ of the entire area of the medium.

This problem is not so serious in disc-type optical recording mediums such as a video disc, compact disc, etc. because they have a sufficient recording area.

However, in the card-type optical recording medium, the area which can be used for recording data is by far limited as compared with the disc-type optical recording medium. By this reason, the reduction of the recording area due to the provision of the tracking lines is serious and not negligible in the card-type optical recording medium.

In especial, when the medium is applied to a use in which a enormous amount of data is to be stored, for example a use as a dictionary, it is essential to use the data recording region effectively. In this respect, the provision of the tracking lines which reduces the effective data recording area remarkably is not desirable.

SUMMARY OF THE INVENTION

The present invention has been made to obviate the problem and it is an object of the present invention to provide an optical recording medium which is capable of setting tracking lines without reducing the effective data recording area and therefore capable of increasing the data storage capacity very much.

The present invention features an optical recording medium having a data recording region which is characterized in that a face of the data recording region is formed in a stepped configuration comprising recessed portions and raised portions arranged alternatingly along each other, said recessed portions and raised portions each providing a data track, a boundary edge between any two adjacent recessed and raised portions being usable as a tracking line, thereby to allow data to be written in each of the recessed and raised portions, while referring to the tracking line.

The depths of the steps formed on the data recording face by said recessed portions and said raised portions are so selected as to cause a difference in luminances between light reflected from the recessed portions and light reflected from the raised portions, respectively. For example, the depths of the steps are selected to be larger than a depth of a focus of an optical system usable for effecting data writing/reading with respect to the optical recording medium. The depths of the steps may be selected so that a difference in luminances may be caused by interference between lights. For example, when the data recording region has a light reflection plane at its bottom surface or its intermediate position, the stepped configuration is so formed that either one of the recessed portion and the raised portion of the data recording region has a thickness corresponding to a phase difference in which light reflected from a surface of said recessed portion or said raised portion and light reflected from said reflection plane at the lower surface or at the intermediate position may be diminished (or intensified) by each other. In this case, if either one of the recessed portion and the raised portion has a thickness to diminish the reflected lights, while the other having a thickness to intensify the reflected lights, then the difference in luminances will be more clear.

The recessed portions and the raised portions preferably have equal widths. The recessed portions and the raised portions have widths sufficient to provide at least one data track therein, respectively. However, the widths may alternatively be so selected to provide two or more tracks therein. Or, each of the recessed portions may have one data track, while each of the raised portions having two tracks, or vice versa.

The optical recording medium according to the present invention may be used as a medium solely for reading out data preliminarily written therein, as a medium adapted to be written by users, or as a medium of once-writable type. In the case of the once-writable type, the prerecorded may be in the recessed portions, while the later-writable may be in the raised portions, or vice verse.

OPERATION

In the optical recording medium of the present invention, data tracks are provided in the recessed portions and raised portions which are formed on the data recording region so as to be arranged alternatingly and extend along each other. The relative positioning between the data tracks and a reading/writing head is carried out by using boundary edges between the respective recessed portions and the respective raised portions. More particularly, a tracking light beam is irradiated upon the boundary edge between the recessed portion and the raised portion and a change in reflected light amount is detected to detect a tracking error.

More specifically, since there is a difference in heights from the surface of the data recording region, between the recessed portion and the raised portion, a difference is caused in luminances between the reflected lights from the recessed portion and the raised portion, respectively. The boundary of the differing luminances is detected to detect the boundary edge between the recessed portion and the raised portion, for detecting a tracking error. For example, when the stepped depth between the recessed portion and the raised portion is larger than the depth of a focus of the optical system employed, reflected light from the focused face, either the recessed portion or raised portion, will be more intensive. As a result of this, there is caused a difference in luminances between the reflected lights from the recessed portion and the raised portion. The boundary between the different luminances can be detected as an edge of the band-form tracking line in the conventional optical recording medium.

When the stepped depth between the recessed portion and the raised portion is so selected to cause a difference in luminances by utilizing interference between lights, the luminance of either one of the recessed or raised portions is weakened (or intensified), causing a difference in luminances between the reflected lights from the recessed and raised portions. Thus, the tracking can be effected in a similar way to the above. This case, however, is advantageous in that it can effect tracking even if the stepped depth is too small to cause a difference in luminances by focusing.

Thus, according to the present invention, the tracking is effected by using the boundary edges between the respective recessed portions and the respective raised portions, as by the tracking lines provided in the conventional optical recording medium.

As apparent from the above, the tracking lines can be provided without reducing the effective data storing area. Thus, the data amount to be stored can be remarkably increased. This enables a large amount of data to be stored within a card-type recording medium which has only a limited data recording space, realizing a dictionary in card form.

PREFERRED EMBODIMENTS

Figure 1:
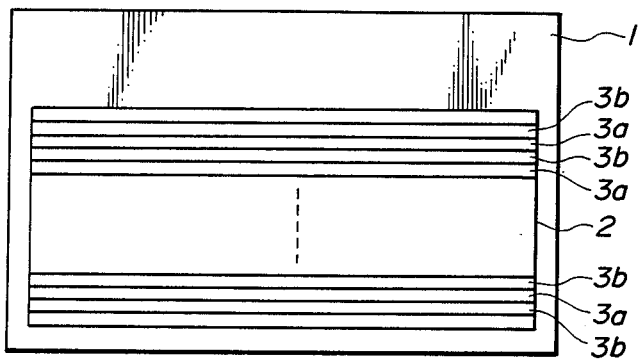
FIG. 1 is a plan view showing an appearance of one form of optical recording medium according to the present invention.

Preferred embodiments of the present invention will now be described referring to the drawings.

First Embodiment

Figure 2:
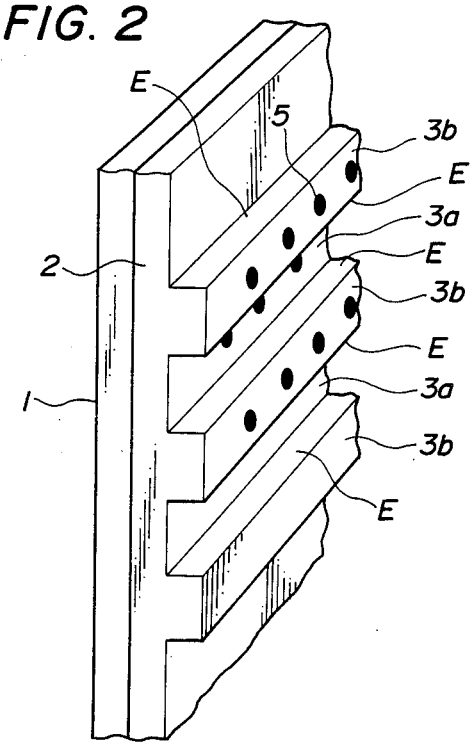
FIG. 2a is an enlarged perspective view of a characteristic portion of the medium.
FIG. 2b is an enlarged perspective view of an alternate configuration of the optical recording medium having multiple data tracks per raised and recessed portion.
Figure 2A:
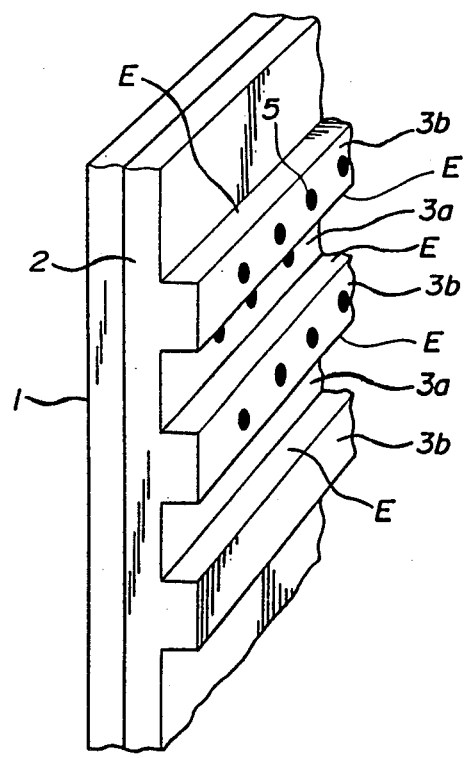
Figure 2B:
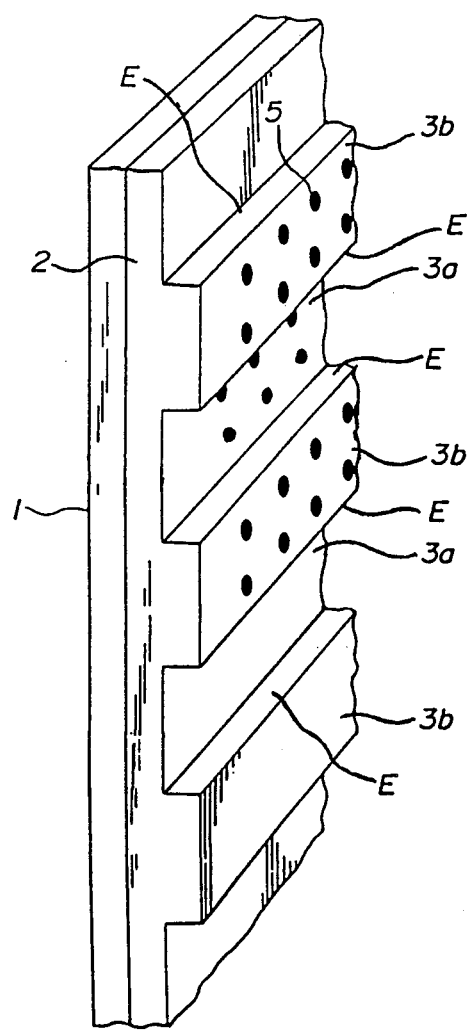

FIG. 1 shows an appearance of a first form of optical recording medium according to the present invention. FIG. 2 shows a characteristic portion of the medium in an enlarged scale.

As shown in FIG. 1, the optical recording medium according to the present embodiment has a recording region 2 provided on a major face of a card-form substrate 1 and containing, as a data recording region, recessed portions 3a and raised portions 3b which are arranged alternatingly in parallel with each other along a reading/writing direction.

The card-form substrate 1 is made of a plastic material, for example, and formed in a similar shape and size to those of a magnetic card.

In the recording medium 2, a material which is capable of optically recording or storing data is provided in a layer or layers. For example, a material, which is locally molten to lower a reflectivity or locally blackened to lower a reflectivity when subjected to light irradiation, is coated in a layer or layers on the substrate to form the recording region 2. A lower face of the layer or an interface between the layers forms a reflection plane. In the data recording region in the recording region 2, the recessed portions 3a and the raised portions 3b are formed so as to have the same width and arranged alternately.

These recessed portions 3a and the raised portions 3b are formed so that the upper surface of the recording region 2 may be stepped by one to several tens microns. The recessed and raised portions may be formed easily, for example, by using a photolithography technique. The boundary edge E between the recessed portion 3a and the raised portion 3b is preferably made as sharp as possible.

Both the recessed portions 3a and the raised portions 3b are used as the data recording region as described above. More specifically, data is written by forming pits 5 as illustrated in FIG. 2. In this connection, it is to be noted that data may be preliminarily written in both or either of the recessed portions 3a and the raised portions 3b. In this case, the data is written by photolithography at the same time as the recording region 2 is formed.

An operation for reading/writing data from/into the optical recording medium as described above will now be described, referring to FIGS. 3 and 4 together with FIGS. 1 and 2.

Figure 4:
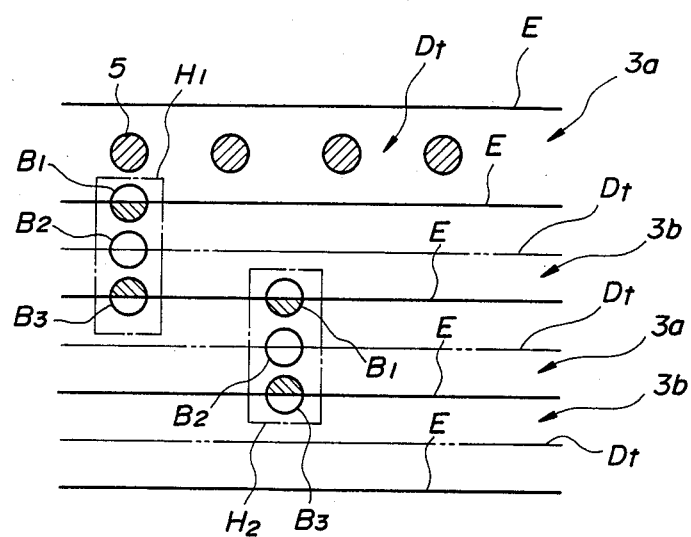
FIG. 4 is an explanatory view for schematically illustrating an operation of the present embodiment.

According to the present embodiment, three light beams B1, B2 and B3 are used for reading/writing the data from/into one data track, as shown by three light spots in FIG. 4. The light beams B1, B2 and B3 are so disposed that the light spots formed on the recording region 2 by the beams B1 and B3, respectively, may be positioned on the respective boundary edges E between the recessed portions 3a and the raised portions 3b while the spot formed by the beam B2 being positioned centrally.

Figure 3:
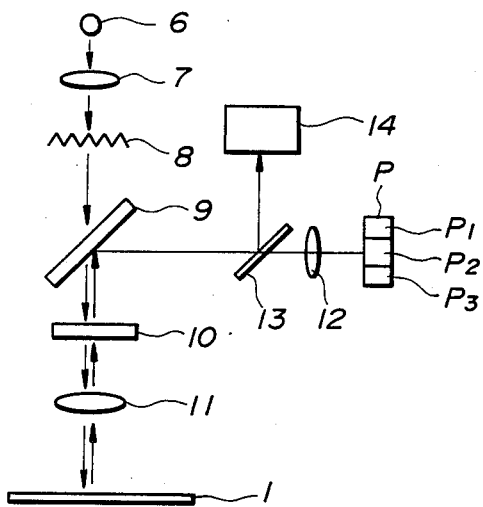
FIG. 3 is a light path diagram illustrating one form of an optical system usable for reading/writing of the medium.

The light beams B1, B2 and B3 are formed by an optical system as illustrated in FIG. 3. This optical system comprises a light source 6 such as a semiconductor laser, a collimating lens 7 for rendering light radiated from the light source 6 to be parallel, a diffraction grating 8 for splitting light beam into a plurality of (three in the present embodiment) beams, a beam splitter 9 for dividing the transmitted light from the reflected light, a quarter-wave plate 10 for letting polarization planes of incident light upon the optical recording medium and reflected light be intersected with each other, an objective lens 11, an ocular lens 12 for letting the reflected light from the optical recording medium 1 form an image on a photodetector P, a beam splitter 13 for branching a part of light beam to the ocular lens 12, and an autofocusing device 14 for effecting focusing by the branched light beam.

The photodetector P comprises, for example, three PIN photodiodes formed on a single substrate. P2 is for reading and P1 and P3 arranged on the opposite sides of P2 are for tracking. The reading photodetector P2 is connected to a reading circuit not shown. The tracking photodetectors P1 and P3 are connected, at the respective outputs thereof, to a differential amplifier not shown to detect a difference in light amounts therebetween. A focusing detector (not shown) is provided in the autofocusing device.

The optical system as described above may be used in common for both the reading and writing. In the writing, the output energy of the light source 6 is increased so that the portion irradiated by the light beam B2 may be changed physically or chemically to cause an optical change for writing data. On the other hand, in the reading, the output energy is reduced to form a light spot for reading the optical change, which has been preliminarily formed at the spot irradiated portion, as information by the reflected light, without causing any physical or chemical changes at the portion where the light beam B2 is irradiated.

In this connection, it is to be noted that since the intenses of the light beams B1 and B3 are so selected as to be 1/10 or less than that of the light beam B2, the physical or chemical change at portions irradiated by these light beams B1 and B3 might be neglectable even at the time of the writing.

Although the optical system as illustrated is of an on-center type, it may alternatively be of an off-center type.

In order to write data in the raised portion 3b of the optical recording medium of this embodiment by using the optical system as illustrated, the light beam B2 is first focused onto the surface of the raised portion 3b by the autofocusing device 14 The light beams B1 and B3 irradiated across the boundary edges E each have an inner portion of high luminance (shown by shadowing in FIG. 4) since the light beam B2, and therefore the light beams B1 and B3, are focused on the face of the raised portion 3b. The outer portion of each of the spots formed by the light beams B1 and B3 is of low luminance since the light beams B1 and B3 irradiate the unfocused recessed portions 3a there.

The high-luminance portions are detected by the photodetectors P1 and P3, respectively. If there is a difference between outputs from these photodetectors, the difference is detected as a tracking error. An optical head is relatively displaced in a direction of the width of the raised portion 3b by a not shown servo-control system to correct the tracking error.

As a result of this, the center of the light beam B2 is positioned centrally at the raised portion 3b where the data is to be written, so that pits 5 can be accurately formed on the data track Dt to write data.

Then, to write data in the recessed portion 3a of the optical recording medium of the present embodiment, the light beam B2 is focused onto the face of the recessed portion 3a by the autofocusing device 14. The light beams B1 and B3 irradiated across the boundary portion E have each an inner portion of high luminance (shown by shadowing in FIG. 4) as shown by H2 in FIG. 4 since the beams are focused on the face of the recessed portion 3a. On the other hand, the outer portions where the beams are not focused are of low luminance.

The high-luminance portions are similarly detected by the photodetectors P1 and P3, to detect and correct a tracking error in a way similar to the above-mentioned.

The operation for writing data has been described above, but an operation for reading the data is also identical.

In the present embodiment, as described above, light beams are irradiated across the respective boundary edges E between the recessed portions 3a and the raised portions 3b to detect light amounts of the high-luminance portions appearing on either side of the respective boundary edges within the light spots formed by the beams, respectively, and a difference in light amounts between the high-luminance portions at the boundary portion E, between which the desired data track is, is detected to detect a tracking error. Thus, the boundary edge itself acts as a tracking line and it functions similarly to an edge of the conventional tracking band.

In the embodiment as illustrated, the recessed portions 3a and the raised portions 3b are formed so that the surface of the recording region 2 may be stepped by 1 to several tens microns, but the step may be deeper or may be shallower alternatively.

Second Embodiment

A second form of optical recording medium embodying the present invention is essentially similar to the optical recording medium as illustrated in FIG. 1. The characteristic feature of the present embodiment different from the foregoing embodiment lies in that a thickness or height of the data recording region 2 from the lower surface thereof or another reflecting plane positioning intermediate the thickness is specifically selected. More particularly, the stepped portion of the surface of the recording region is formed as follows; the thickness of the recessed portion is selected to have such a phase difference that light reflected from the surface of the recessed portion and light reflected from the lower surface thereof or another, intermediate reflecting plane may be diminished with each other, while the thickness of the raised portion is selected so that the reflected lights may not be diminished with each other. More specifically, the thickness is concretely determined by a refractive index of a material of the data recording region 2 and a working wavelength of light beam as used. The step depth formed in this embodiment may, for example, be about 0.5 um.

As a result of this, when light beam as adapted is irradiated, the luminance of reflected light from the recessed portion is lowered, while the luminance of reflected light from the raised portion is not lowered, thus producing a difference in luminances between the recessed portion and the raised portion. In this case, if the step depth is smaller than the depth of a focus of the optical system, either of the recessed and raised portions is in focus even though the focus of the optical system is adjusted to either one of the portions. Thus, the luminance distribution is never changed with a focal position.

When such an optical system is used, if the light beam B2 is focused on either the recessed portion 3a or the raised portion 3b by the autofocusing device 14 for reading/writing the data as shown by H1 and H2, the luminance distribution of the reflected lights is not changed by the step. The luminance becomes high on the side of the raised portion 3b where the light beams are not diminished by each other and it becomes low on the side of the recessed portion 3a where the light beams are diminished by each other. Therefore, with the photodetector positioned at H1 in FIG. 5, the inner portions of the light spots (shown by shadowing in FIG. 5) are of high luminance since the inner portions are located on the raised portion 3b, while the outer portions are of lower luminance. A difference in luminances is thus detected to detect and correct a tracking error in a manner similar to the foregoing embodiment.

Figure 5:
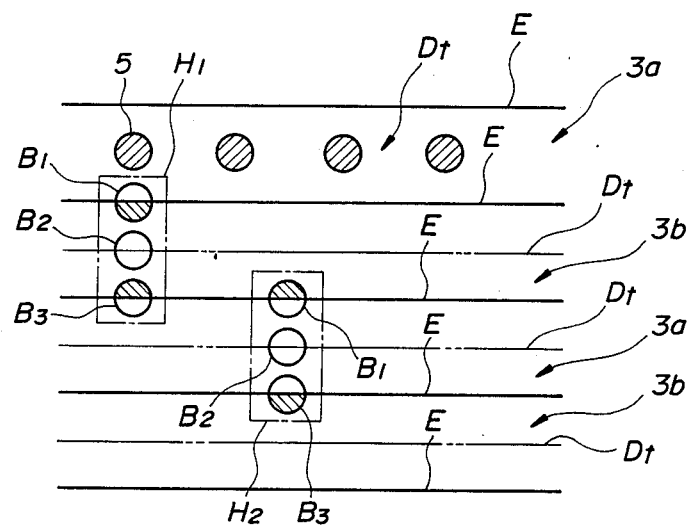
FIG. 5 is a similar explanatory view for schematically illustrating an operation of another form of optical recording medium according to the present invention.

When the step depth is larger than the depth of a focus of the optical system, the method as described in connection with the present embodiment, referring to FIG. 5 may be employed to correct a tracking error, if a difference in luminances caused by focusing of the optical system onto the recessed portion or the raised portion is smaller than a difference in luminances caused by interference between the lights. If the former difference is larger than the latter difference, the method as described in connection with the first embodiment may be employed for correcting a tracking error.

In modifications of the present embodiment, the raised portion may be so formed that the reflected lights may not be diminished by each other, or either one of the recessed portion or the raised portion may alternatively be formed so that the reflected lights may be intensified by each other, while the reflected lights at another portion may not be intensified. Or, either one of the recessed portion or the raised portion may be formed so that the reflected lights may be intensified (or diminished), while the other may be formed so that the reflected lights may be diminished (intensified).

OTHER EMBODIMENTS

In the foregoing embodiments, the widths of the recessed portion and the raised portion are equal to each other, but the widths of the recessed portion and the raised portion may be differentiated from each other. Although one data track Dt is formed in each of the recessed portions and the raised portions in the foregoing embodiments, two or more data tracks may be provided in each of the recessed and the raised portions, or in either of the recessed or raised portion. In this case, the width of the recessed portion and/or the raised portion where two or more data tracks Dt are provided may be wider than that of the recessed or raised portion where a single data track Dt is provided.

I claim:

1. An optical recording system comprising an optical recording medium and means for reading data from said optical recording medium, said optical recording medium including a data recording region having a face formed on a substrate in a stepped configuration comprising adjacent elongated recessed surface portions and elongated raised surface portions, each said recessed and raised surface portions parallel to a major surface of said substrate, said recessed surface portions and said raised surface portions positioned at respective different heights relative to said major surface of said substrate and alternately arranged across said recording region, said recessed surface portions and said raised surface portions each providing a data track, a boundary edge between any two adjacent recessed and raised surface forming a tracking line, said data recording means having an optical system including a read head for reading data from said data track of said optical recording medium, and tracking means for detecting said boundary edge between recessed and raised portions of said optical recording medium and positioning said read head in response thereto.

2. An optical recording system as claimed in claim 1, in which the depths of the steps of the data recording surface of said data recording medium formed by said recessed portions and said raised portions are larger than a depth of a focus of said optical system of said data reading means.

3. An optical recording system as claimed in claim 1, in which the depths of the steps formed on the data recording face of said optical recording medium by said recessed portions and said raised portions are smaller than a depth of a focus of said optical system of said data reading means.

4. An optical recording system as claimed in claim 1, in which said data recording region of said optical recording medium has a light reflecting surface beneath said recessed surface portion and parallel to said major surface of said data recording region and one of the recessed surface portion and the raised surface portion of the data recording region is positioned at a distance above said reflecting surface corresponding to a phase difference in which light reflected from said one surface portion and light reflected from said reflecting surface destructively interfere with and are thereby diminished by each other.

5. An optical recording system as claimed in claim 1, in which said data recording region of said optical recording medium has a light reflecting surface beneath said recessed surface portion and parallel to said major surface of said data recording region and one of the recessed surface portion and the raised surface portion of the data recording region is positioned at a distance above said reflecting surface corresponding to a phase difference in which light reflected from said one surface portion and light reflected from said reflecting surface constructively interfere with and are thereby intensified by each other.

6. An optical recording system as claimed in claim 1, in which said data recording region of said optical recording medium has a light reflecting surface beneath said recessed surface portion and parallel to said major surface of said data recording region and one of the recessed surface portion and the raised surface portion of the data recording region is positioned at a distance above said reflecting surface corresponding to a phase difference in which light reflected from said one surface portion and said reflecting surface destructively interfere with and are thereby diminished by each other and the other one of the recessed surface portion and the raised surface portion is positioned above said reflecting surface by a distance corresponding to a phase difference in which light reflected from said other surface portions and light reflected from said reflecting surface constructively interfere with and are thereby intensified by each other.

7. An optical recording system as claimed in claim 3, in which said data recording region of said optical recording medium has a light reflecting surface beneath said recessed surface portion and parallel to said major surface of said data recording region and one of the recessed surface portion and the raised surface portion of the data recording region is positioned above said reflecting surface at a distance corresponding to a phase difference in which light reflected from said one surface portion and light reflected from said reflecting surface destructively interfere with and are thereby diminished by each other.

8. An optical recording system as claimed in claim 3, in which said data recording region of said optical recording medium has a light reflecting surface beneath said recessed surface portion and parallel to said major surface of said data recording region and one of the recessed surface portion and the raised surface portion of the data recording region is positioned above said reflecting surface at a distance corresponding to a phase difference in which light reflected from said one surface portion and light reflected from said reflecting surface constructively interfere with and are thereby intensified by each other.

9. An optical recording system as claimed in claim 3, in which said data recording region of said optical recording medium has a light reflecting surface beneath said recessed surface portion and parallel to said major surface of said data recording region, one of the recessed surface portion and the raised surface portion of the data recording region is positioned above said reflecting surface at a distance corresponding to a phase difference in which light reflected from said one surface portion and light reflected from said reflecting surface destructively interfere with and are thereby diminished by each other and the other of said recessed or raised surface portion is positioned above said reflecting surface at a distance corresponding to a phase difference in which light reflected from said other surface portion and light reflected from said reflecting surface constructively interfere with and are thereby intensified by each other.

10. An optical recording system medium as claimed in claim 1, in which said recessed surface portions and said raised surface portions of said optical recording medium have equal widths.

11. An optical recording system medium as claimed in claim 2, in which said recessed surface portions and said raised surface portions of said optical recording medium have equal widths.

12. An optical recording system medium as claimed in claim 3, in which said recessed surface portions and said raised surface portions of said optical recording medium have equal widths.

13. An optical recording system medium as claimed in claim 4, in which said recessed surface portions and said raised surface portions of said optical recording medium have equal widths.

14. An optical recording system medium as claimed in claim 5, in which said recessed surface portions and said raised surface portions of said optical recording medium have equal widths.

15. An optical recording system medium as claimed in claim 6, in which said recessed surface portions and said raised surface portions of said optical recording medium have equal widths.

16. An optical recording system medium as claimed in claim 7, in which said recessed surface portions and said raised surface portions of said optical recording medium have equal widths.

17. An optical recording system medium as claimed in claim 8, in which said recessed surface portions and said raised surface portions of said optical recording medium have equal widths.

18. An optical recording system medium as claimed in claim 9, in which said recessed surface portions and said raised surface portions of said optical recording medium have equal widths.

19. An optical recording system as claimed in claim 1, in which said recessed portions of said optical recording medium have widths for accommodating a plurality of adjacent data tracks.

20. An optical recording system as claimed in claim 2, in which said recessed portions of said optical recording medium have widths for accommodating a plurality of adjacent data tracks.

21. An optical recording system as claimed in claim 3, in which said recessed portions of said optical recording medium have widths for accommodating a plurality of adjacent data tracks.

22. An optical recording system as claimed in claim 1, in which said raised portions of said optical recording medium have widths for accommodating a plurality of adjacent data tracks.

23. An optical recording system as claimed in claim 2, in which said raised portions of said optical recording medium have widths for accommodating a plurality of adjacent data tracks.

24. An optical recording system as claimed in claim 3, in which said raised portions of said optical recording medium have widths for accommodating a plurality of adjacent data tracks.

25. An optical recording system as claimed in claim 1, in which said recessed portions and said raised portions of said optical recording medium have widths for accommodating a plurality of adjacent data tracks.

26. An optical recording system as claimed in claim 2, in which said recessed portions and said raised portions of said optical recording medium have widths for accommodating a plurality of adjacent data tracks.

27. An optical recording system as claimed in claim 3, in which said recessed portions and said raised portions of said optical recording medium have widths for accommodating a plurality of adjacent data tracks.

28. An optical recording system including means for reading data from an optical recording medium and means for reading data from said optical recording medium, said optical recording medium having a data recording face, which comprises recessed and raised portions formed on said data recording face arranged alternately and both extending in a data reading/writing direction providing data tracks; and boundary edges formed and defined between respective adjacent raised portions, which edges extend along the data tracks and form tracking lines, said data reading means including means responsive to the boundary edges as tracking lines for tracking said data tracks while reading data from said medium.

* * * * *